US008905313B2

(12) United States Patent
Rapoport et al.

(10) Patent No.: US 8,905,313 B2
(45) Date of Patent: Dec. 9, 2014

(54) METHOD AND SYSTEM FOR CREATING AND READING MULTI-COLOR CO-PLANAR EMISSIVE INDICIA USING PRINTABLE DYES AND PIGMENTS

(75) Inventors: William Ross Rapoport, Bridgewater, NJ (US); Karl J. Smith, Sparta, NJ (US); Howard A. Fraenkel, Lebanon, NJ (US)

(73) Assignee: Honeywell International Inc., Morristown, NJ (US)

( * ) Notice: Subject to any disclaimer, the term of this patent is extended or adjusted under 35 U.S.C. 154(b) by 1221 days.

(21) Appl. No.: 11/786,795

(22) Filed: Apr. 12, 2007

(65) Prior Publication Data

US 2008/0252066 A1 Oct. 16, 2008

(51) Int. Cl.
| | |
|---|---|
| *G06K 7/00* | (2006.01) |
| *G06K 19/06* | (2006.01) |
| *B41M 1/14* | (2006.01) |
| *B41J 11/00* | (2006.01) |
| *B41M 3/14* | (2006.01) |
| *B41M 5/00* | (2006.01) |

(52) U.S. Cl.
CPC ......... *G06K 19/06046* (2013.01); *B41J 11/002* (2013.01); *B41M 1/14* (2013.01); *B41M 3/14* (2013.01); *B41M 5/00* (2013.01); *G06K 19/06037* (2013.01); *G06K 2019/06225* (2013.01)
USPC ............. 235/462.04; 235/462.01; 235/462.02

(58) Field of Classification Search
CPC .............. G06K 19/06037; G06K 2019/06225; G06K 7/12; G06K 19/06028; G06K 19/06009; G06K 7/14
USPC .......................... 235/462.01, 462.04, 468, 469
See application file for complete search history.

(56) References Cited

U.S. PATENT DOCUMENTS

| 5,128,528 | A | 7/1992 | Heninger ....................... 235/470 |
| 5,576,528 | A | 11/1996 | Chew et al. .................... 235/469 |
| 5,592,561 | A | 1/1997 | Moore ............................ 382/103 |
| 5,763,891 | A | 6/1998 | Yoshinaga et al. .......... 250/459.1 |
| 6,119,943 | A | 9/2000 | Christy .......................... 235/468 |
| 6,123,263 | A | 9/2000 | Feng ......................... 235/462.42 |
| 6,246,778 | B1 | 6/2001 | Moore ............................ 382/103 |

(Continued)

FOREIGN PATENT DOCUMENTS

| DE | 102 07 180 | 5/2003 |
| FR | EP0745484 | 12/1996 |

(Continued)

*Primary Examiner* — Christopher Stanford
(74) *Attorney, Agent, or Firm* — Ingrassia Fisher & Lorenz PC

(57) ABSTRACT

A method and system for identifying, tracking, and/or authenticating objects that is simple to apply and to use by an intended user, but is extremely difficult to counterfeit or compromise by an unintended user. Also disclosed is a multi-color, co-planar indicium made of a combination of printed patterns of multiple inks. The printed patterns may be modified by software-generated masks to ensure that the patterns are co-planar. The indicium is undecipherable unless irradiated with specified wavelengths of light radiation, filtered through specified spectral filters, and read and decoded by an electronic image reader. The indicium may be visible or covert. The indicium encodes unique true information about the object and may encode nonsensical or intentionally incorrect information as a further deterrent to unauthorized use. The method permits the indicia to be applied to objects at high processing speeds possible with inkjet printing.

19 Claims, 5 Drawing Sheets

(56) References Cited

U.S. PATENT DOCUMENTS

| | | |
|---|---|---|
| 6,250,733 B1 * | 6/2001 | Yao et al. ............... 347/15 |
| 6,296,189 B1 | 10/2001 | Lawandy et al. ........... 235/491 |
| 6,354,501 B1 * | 3/2002 | Outwater et al. ........ 235/462.01 |
| 6,373,965 B1 | 4/2002 | Liang ..................... 382/112 |
| 6,578,712 B2 | 6/2003 | Lawandy et al. ........... 209/3.3 |
| 6,612,494 B1 | 9/2003 | Outwater ............... 235/462.04 |
| 7,185,816 B1 * | 3/2007 | Shoobridge ............ 235/462.04 |
| 2002/0079249 A1 | 6/2002 | Lawandy et al. ........... 209/3.3 |
| 2004/0004126 A1 * | 1/2004 | Christian ............. 235/462.25 |

FOREIGN PATENT DOCUMENTS

| | | |
|---|---|---|
| JP | 09-118009 A | 5/1997 |
| JP | 10-320499 A | 4/1998 |
| JP | 2005-262681 A | 9/2005 |
| WO | WO9850882 | 11/1998 |
| WO | WO01/24106 | 4/2001 |
| WO | WO03/105075 | 12/2003 |
| WO | WO2004/025542 | 3/2004 |

* cited by examiner

METHOD AND SYSTEM FOR CREATING AND READING MULTI-COLOR CO-PLANAR EMISSIVE INDICIA USING PRINTABLE DYES AND PIGMENTS

BACKGROUND OF THE INVENTION

1. Field of Invention

The present disclosure provides a multi-color, co-planar indicium that is applied to an object or its packaging to track and/or authenticate the object, and to thwart counterfeiting. The present disclosure further provides a method and system using the multi-color, co-planar indicium for tracking and/or authentication requiring individualized combinations of chemical pigments, light energy sources, and spectral filters to create a sophisticated level of encryption. Bitmap masks may be used to increase the accuracy, precision and speed of the printing process used to print the multi-color indicium.

2. Description of the Related Art

Recently, brand security has become an important issue. The production of counterfeit goods has been rapidly increasing and reaches across a wide range of products. In many instances, the quality of the counterfeit goods is significantly poorer that the original and cannot be safely used in the intended manner.

Another problem is diversion of authentic goods from their intended point of sale, which can manifest itself where there are regional wholesale price differentials for the same goods. The supply chain in such circumstances may be circuitous and difficult to monitor. Some of the goods may not have been intended for sale in a particular country and, when diverted, actually compete with legitimate products intended for that country.

Greater pressure is being felt by brand owners to take responsibility for the safety of their products and for knowing that the end user is purchasing a legitimate product. A sophisticated, yet standardized method for authentication and for tracking and tracing products is needed.

Existing track-and-trace systems involve printing a mark that is encoded with unique information on an object or its packaging, so that the individual object or packaging can be tracked through the supply chain. Examples of marks include one-dimensional (1-D) and two-dimensional (2-D) barcodes, such as Code 128, UPC, Aztec, DataMatrix and PDF barcodes. These barcodes are in wide use because the barcodes can be used royalty-free, and because there are commercially-available devices that can encode, print, detect, read and decode these indicia. Some favorable attributes of these marks are high information density, small physical size, and error correction capability.

A matrix code is a two-dimensional way of representing information. An example of a matrix code is a two-dimensional (2-D) barcode. A 2-D barcode is similar to the one-dimensional (1-D, or linear) barcode, such as the familiar UPC code used to track groceries, but a 2-D barcode permits greater data representation density than a 1-D barcode.

In practical terms, there are problems when using currently-available systems to produce a printable mark. Part of the difficulty is that some attributes of the systems are necessarily in direct conflict with each other. For example, the mark ideally needs to be as small as possible (to be more difficult for an unauthorized user to locate), but its information content needs to be high. Another problem is the difficulty in printing such marks on a high-speed packaging line with sufficient dots per inch (DPI), without smearing the mark due to box-to-box rubbing, lack of drying time, substrate adhesion issues, and surface porosity, particularly given the wide variety of substrates and coatings on which the mark is applied.

Another problem with currently-available systems is that a mark cannot be easily read and decoded by commercially-available electronic image readers when printed as a covert mark or indicium (that is, invisible under normal lighting conditions or blended into the color of the substrate onto which the indicium is printed) because of a lack of sufficient contrast ratio. The same rules for decoding images apply to covert cases as well as the traditional black marks on white substrates: i.e., sufficient resolution, contrast ratio, clarity of print, and uniformity of signal are required.

Printing a co-planar indicium or mark having multiple colors of inks involves additional registration requirements, where the term "registration" means the accurate positioning and alignment of the printer head with the substrate onto which the indicium is printed. The problem of accurate registration of the substrate is particularly acute for a multi-color indicium because adjacent colors may otherwise overlap or bleed into each other, thereby interfering with accurate reading and decoding.

The improving sophistication of counterfeiters and unauthorized users to locate and copy and/or replicate an indicium, particularly when combined with rapidly-improving printing technologies, has led to the need to create a more sophisticated system having many more chemical and coding permutations than are currently available, without sacrificing ease of use, economy, or accuracy when used by an authorized user.

Thus, it is desired to develop a method and system for tracking and/or authenticating articles using a multi-color, co-planar indicium that is easy to apply, detect, read, and decode by an authorized user, and yet possesses a high level of encryption so as to be extremely difficult to replicate or copy by an unauthorized user or counterfeiter.

The desired method and system to achieve this goal would have the flexibility to use many different chemical pigments and/or dyes from a wide variety of suppliers. It is also desirable that, wherever possible, the hardware and associated software used be "commercial off-the-shelf" (COTS) products, to take advantage of the tremendous advances in these technologies, as well as their low cost.

It would also be desirable for such a system to accommodate a large number of combinations of chemical dyes/pigments, light sources, and spectral filters. In this way, am individual customer could receive a "custom" system having an individualized, secret combination of a plurality of inks incorporating taggants consisting of pigmented and/or dyed inks, light sources and spectral filters. The system should also be flexible in order to accommodate future developments in chemical inputs, barcode types, light sources, and spectral filters. Further, the customer should be able to make minor changes to the system relatively inexpensively, such as changing a spectral filter set. In addition, the system also would have the capacity to take advantage of a high signal-to-noise ratio for the indicium. The present disclosure describes a method and system that accomplishes these desired goals, as well as disclosing a multi-color, co-planar indicium used therein.

SUMMARY OF THE INVENTION

The present disclosure provides an indicium that is applied to the surface of an object or its packaging for purposes of identifying, tracking, and/or authenticating the object. The indicium is multi-color, co-planar, and emissive, and comprises two or more printed patterns, each printed in a different color of ink, where each pattern encodes information. There may be a single multi-color indicium or multiple indicia that are applied to an object. The indicium may be visible or covert on the substrate. Masks can be used as an aid to printing the multi-color indicium accurately to minimize areas of overprinting of inks, even at the high printing line speeds available with inkjet, laser, thermal, or piezo printing. The indicium as disclosed herein is undecipherable to an unauthorized user, wherein "undecipherable" means that the indicium cannot be read and/or interpreted by the human eye or by an electronic image reader; however, the indicium is decipherable to an authorized user when the indicium is irradiated with a specific combination of one or more light sources, causing emission of light energy from the pigments and/or dyes used to form the indicium, which is then passed through specific combinations of spectral filters, and read and decoded by an electronic image reader and its associated software. The multiple factors in the method, used in specific combinations, create a sophisticated level of encryption that is easy to use by authorized users, but is difficult to overcome by unauthorized users or counterfeiters.

BRIEF DESCRIPTION OF THE DRAWINGS

The patent or application file contains at least one patent drawing executed in color. Copies of this patent or patent application publication with color drawings will be provided by the Office upon request and payment of the necessary fee.

DETAILED DESCRIPTION OF THE INVENTION

Figure 1:
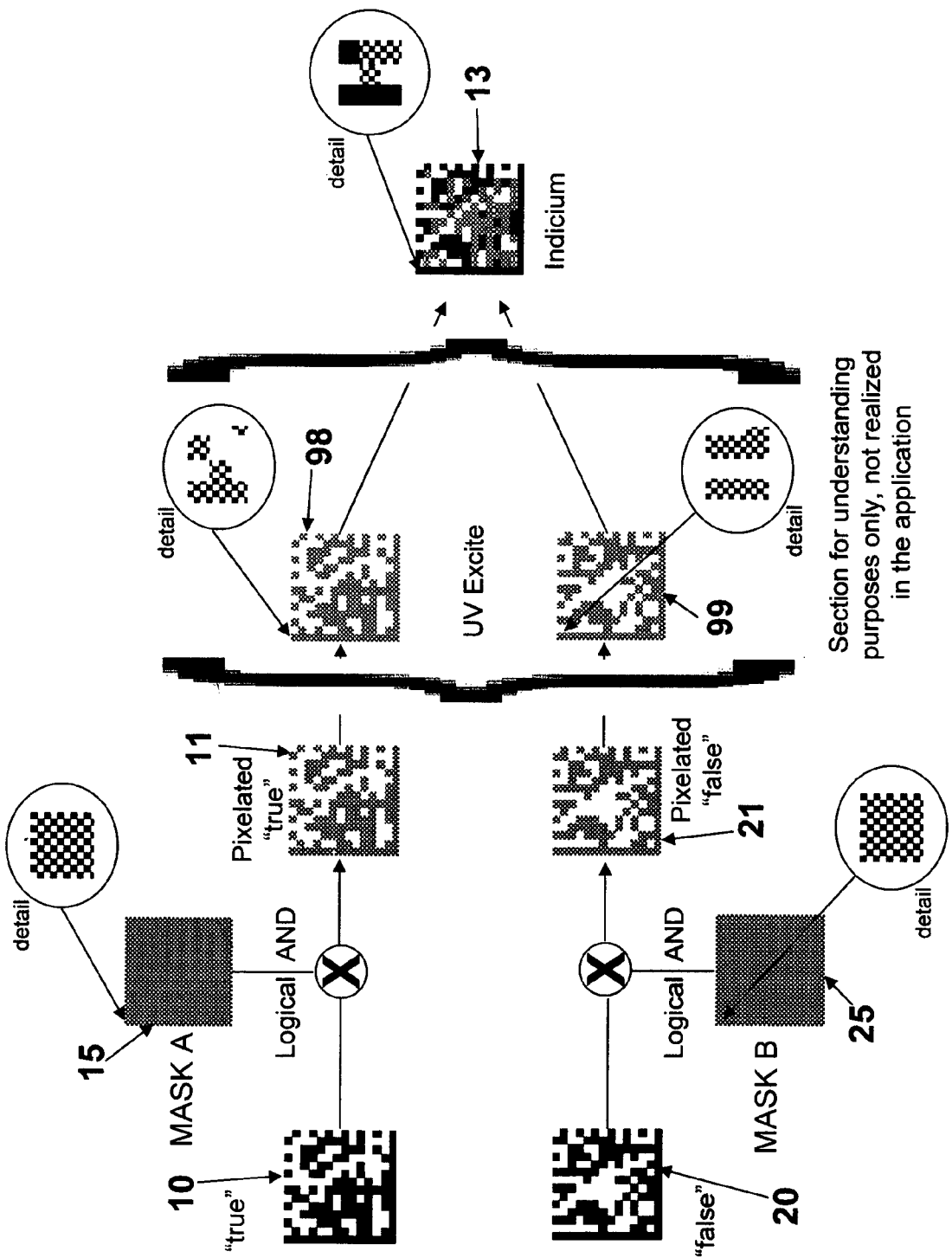
FIG. 1 is a diagram providing an overview of the method by which an indicium of the disclosure is created.

The present disclosure is a multi-color, co-planar emissive indicium that can be applied or printed on an object or packaging for the purposes of identifying, tracking and/or authenticating the object. An indicium is a structured image or mark that contains or encodes information. In the context of the present disclosure, "indicium" is used interchangeably with its plural, "indicia," as there may be one indicium, or more than one indicia, that is applied to an object for these purposes. An indicium may alternatively be called a mark, image, authentication mark, or security mark, and the terms are used interchangeably herein, but is generally referred to as an "indicium" in the present disclosure. The indicium may be visible or may be covert when printed on the surface of an object or substrate.

An indicium of the present disclosure contains printed patterns of inks comprised of chemical pigments or dyes, or combinations thereof (hereafter referred to as "pigments"). These pigments, when energized by irradiation by predetermined wavelengths of light energy in the ultraviolet (UV), visible, and/or infrared (IR) ranges, emit one or more signals at a different wavelength of light energy than the wavelength of the absorbed energy. The emitted signals pass through spectral filters that are selected to pass certain wavelengths of light and to block others, thereby passing filtered signals. The filtered signals can be read by an electronic image reader, and decoded by computer software associated with the electronic image reader. There may be an additional layer of encryption as an additional barrier to unauthorized use, such as the encoding of true and false information in the printed patterns that combine to form the indicium. The decoded signal or signals can then be compared against separate information that is unique to the authentic object or known only to an authorized user, in order to track the object or to check its authenticity as a legitimate (non-counterfeit) object.

Also disclosed herein is a method to identify, track, and/or authenticate an object, by printing or applying a multi-color, co-planar emissive indicium onto an object or substrate, irradiating the indicium with one or more predetermined wavelengths of light energy that causes an emitted signal or signals, filtering the emitted signals through one or more preselected spectral filters to create filtered signals, then reading and decoding the filtered signals with an electronic image reader and associated software to provide decoded information about the object. The resulting decoded information may be compared with separate information that is unique to the object or to the class of objects, or is known to correspond to authentic objects.

The present disclosure also provides a system for authenticating or tracking an object, having a co-planar indicium as described herein, at least one light source, at least one spectral filter, and an electronic image reader.

The method and system described herein offer the advantages of ease of use in the field to an authorized user for tracking or authenticating an object, while presenting a sophisticated method and system that is very difficult to overcome or replicate by an unauthorized user or counterfeiter. As used herein, "authorized user," "intended user," and "customer" are used interchangeably to mean a person or persons, or their designees, who have been legitimately provided the materials and information necessary to accurately decipher an indicium of the present disclosure by the method and system disclosed herein.

Referring now to the figures, FIG. 1 is a diagram providing an overview of the process by which an indicium 13 of the present disclosure is created. In the particular embodiment illustrated in FIG. 1, indicium 13 is formed by the combination of two separate 2-D barcodes (or 2-D DataMatrix codes) 10, 20 that were created with commercial software. FIG. 1 illustrates an embodiment of the present disclosure where indicium 13 is made of a combination of barcodes where one barcode encodes "true" information, but a second barcode encodes "false" information. More specifically, FIG. 1 illustrates a 2-D barcode 10, labeled "true," that was generated by commercially-available software to encode "true" information that identifies, describes, and otherwise "tags" an object for tracking and/or for authentication purposes. FIG. 1 also illustrates a parallel process in which a second 2-D barcode 20 (labeled "false") was generated by commercially-available software to encode "false" information that represents nonsensical or intentionally misleading data that does not identify, describe, or otherwise tag an object for tracking and/or authentication purposes. As shown in FIG. 1, the two 2-D barcodes, 10, 20, are combined to form indicium 13.

FIG. 1 also illustrates a computerized bitmap "mask" 15 (labeled "Mask A") that was logically "anded" to the 2-D barcode 10 by computer software to generate pixelated image 11. Pixelated image 11 represents a "map" that directs the inkjet print head to eject ink of a particular color at the address of the pixel corresponding to that location on the map. Another bitmap mask, 25 (labeled "Mask B") was logically "anded" by software to the Data Matrix 20 to generate pixelated image 21. The pixelated image 21, likewise, indicates an exact pattern of ink that is printed in a second color of ink that is a different color of ink than was used to print pixelated image 11. In the embodiment illustrated in FIG. 1, Mask A 15 and Mask B 25 are "complementary" masks. As used herein, the disclosure that Mask B 25 is a "complementary" mask to Mask A 15 means that each pixel at an address of Mask A that is represented as "dark," or "1," has a corresponding pixel at the same address in Mask B 25 that is "light," or "0," and vice versa. Pixelated images 11 and 21 are combined and aligned to print within the same area of the object, thereby creating indicium 13. However, indicium 13, as the product of combination of pixelated images 11 and 21 in the embodiment shown in FIG. 1, is an "undecipherable" image, where "undecipherable" means that the indicium cannot be read or interpreted by the human eye or an electronic image reader, until it is subjected to the method described herein. The use of complementary masks, as illustrated in FIG. 1, ensures that each individual pixel comprising indicium 13 will be designated to contain no more than one color of ink; that is, each individual pixel may contain the first color of ink, or contain the second color of ink, or contain no ink at all, but cannot contain both a first and second color of ink that are overprinted onto each other, except for a minimal amount of unavoidable overlapping of ink colors along the edges of adjacent pixels because of ink bleeding or imprecise registration of the substrate.

FIG. 1 also provides an illustration that improves the understandability of the embodiment of the present disclosure: the portion of FIG. 1 enclosed within brackets (marked "section for understanding only, not realized in the application"), showing details of pixelated images 98, 99 after "excitement" with UV light of chemical pigments in pixelated images 11, 21. For the embodiment shown in FIG. 1, the bracketed section shows the origins of the "detail" shown for indicium 13; i.e., that certain pixel addresses are designated to be printed with blue ink, and other pixel addresses to be printed with red ink, and still other pixel addresses receive no ink, but no single pixel address is designated to be printed with both blue and red inks. Again, the bracketed section is included only as a visual aid to enhance understanding of how the co-planar indicium is formed, but images 98, 99 are not actually steps in the formation of the indicium 13, and not part of the disclosed method or system.

Although FIG. 1 illustrates an embodiment where two software-generated printed patterns combine to form indicium 13, the present disclosure includes other embodiments where three or more software-generated printed patterns are combined to form indicium 13. Indicium 13 advantageously may comprise two, three, four or more software-generated printed patterns.

Figure 2:
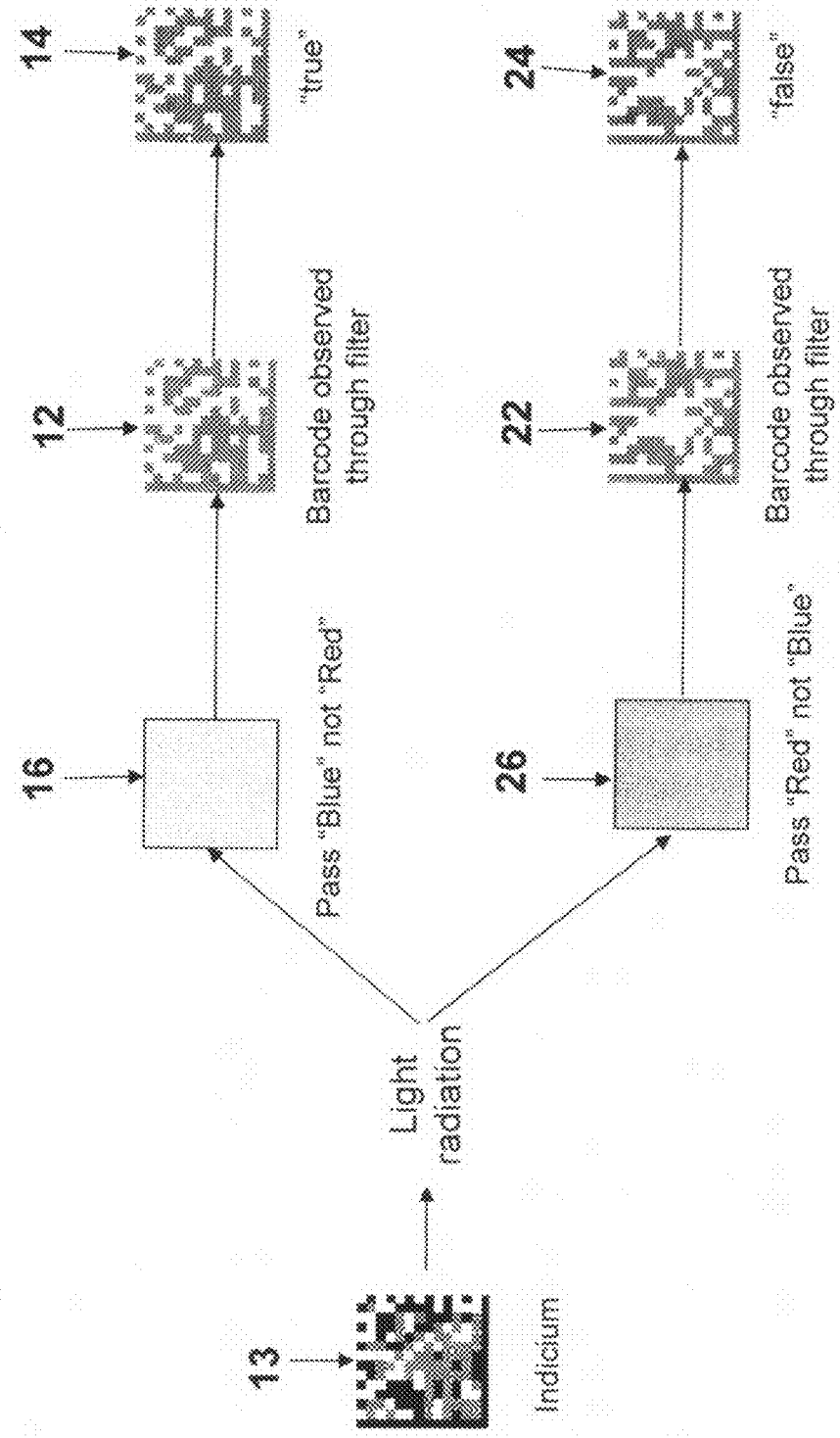
FIG. 2 is a diagram providing an overview of the method by which an indicium of FIG. 1 may be read and decoded by an authorized user, using a combination of light sources, spectral filters, and electronic image reader.

FIG. 2 provides a general overview of the method used to decipher information from indicium 13 for purposes of tracking and/or authenticating objects. In this embodiment, indicium 13 is irradiated with one or more predetermined wavelengths of light produced from one or more light sources, where the wavelengths of light are in the V, visible, and/or IR ranges. The pigments and/or dyes comprising the printed patterns that were combined to form indicium 13 were specially selected to absorb particular wavelengths of light energy, and to emit one or more wavelengths of light energy at a different wavelength than the absorbed wavelengths of light energy. Then the emitted signals from indicium 13 are filtered through one or more spectral filters 16, 26, that are interposed between indicium 13 and an electronic image reader. The spectral filters were selected to pass certain wavelengths (or ranges of wavelengths) of light energy, and to block other wavelengths of light energy. The wavelengths of light energy that are passed through the spectral filters 16, 26 are then read by the electronic image reader as images 12, 22. These images are then deconstructed into the original 2-D barcode (or DataMatrix code). In the specific embodiment illustrated in FIG. 2, spectral filter 16 passes blue wavelengths of light ("blue-pass") but blocks red wavelengths that were emitted by indicium 13, and thereby "passes" image 12 to be read by the electronic image reader. The electronic image reader and its associated software decode image 12 as the 2-D barcode image 14, providing "true" information about the object. Similarly, spectral filter 26 passes red wavelengths of light ("red pass") but blocks blue wavelengths that were emitted by indicium 13, and so passes image 22, that is read by the electronic image reader as 2-D barcode 24 that is decoded by the associated software as "false" information. Not shown in FIG. 2 is that the data matrix images 14, 24 may be further encrypted as an additional layer of protection against unauthorized use or counterfeiting. An authorized user would have a software program to decode this additional layer of encryption.

Figure 3:
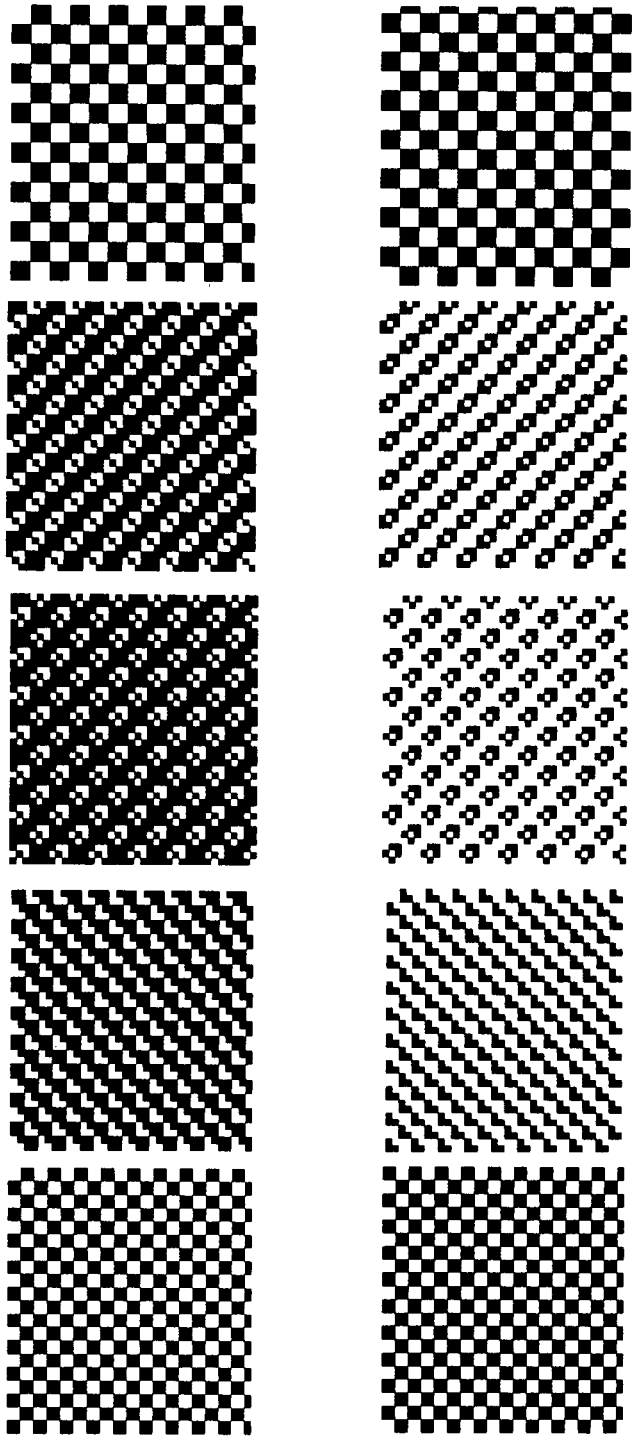
FIG. 3 provides examples of complementary masks that can be used as an aid to create a multi-color, co-planar indicium in FIG. 1.

FIG. 3 depicts five different pairs of complementary masks that may be used in the present disclosure. The masks are computer-generated, and are logically "anded" to the 2-D barcodes 10, 11 to generate pixelated images 11, 21. Because the masks in FIG. 3 are "complementary," no more than one color of ink will be printed in an individual pixel. For this reason, when masks are to be used for this purpose, each color of ink used to print an indicium requires a separate mask. For a multi-color indicium, the number of masks used equals the total number of inks in the indicium.

Figure 4:
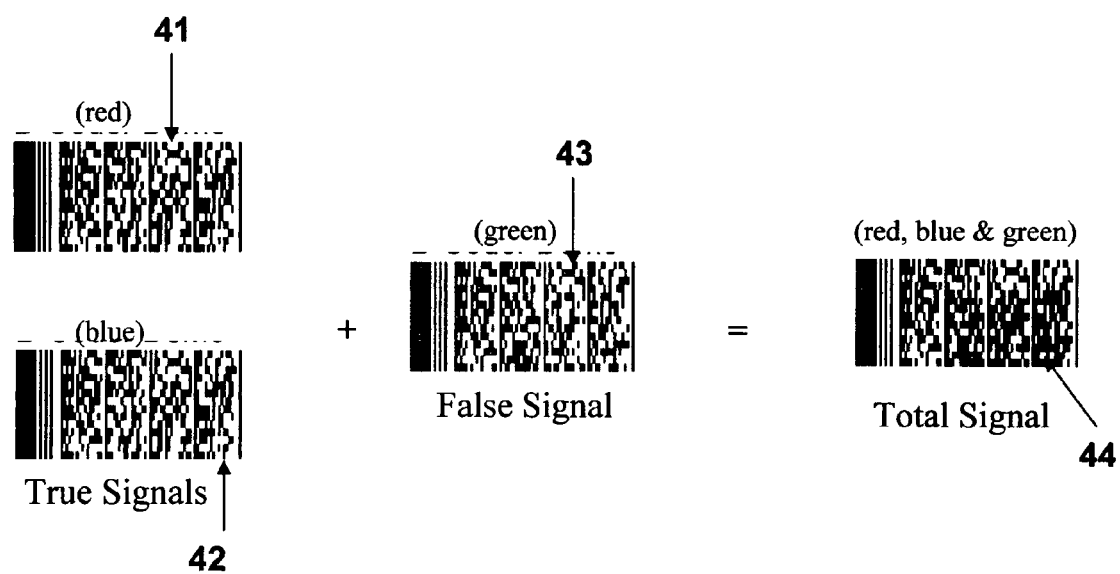
FIG. 4 is a diagram illustrating an embodiment of an indicium of FIG. 1 that is created by combining a printed pattern in a first color of ink encoding "true" information, and a second printed pattern in a second color of ink encoding "false" information, to form a total signal (indicium).

FIG. 4 illustrates an embodiment of an indicium that is created by combining three separate 2-D barcodes. The indicium, labeled in this embodiment as "Total Signal" 44, was created by the combination of three different printed patterns, each in a different color of ink (red, blue, and green), where two of the printed patterns (red 41, and blue 42, respectively) encode "true" information about the object, and a third printed pattern (green 43) encodes "false" information. As an aid to visualizing the barcodes comprising the indicium, the three printed patterns 41, 42 and 43 are illustrated after irradiation from a light energy source of the appropriate predetermined wavelength.

Figure 5:
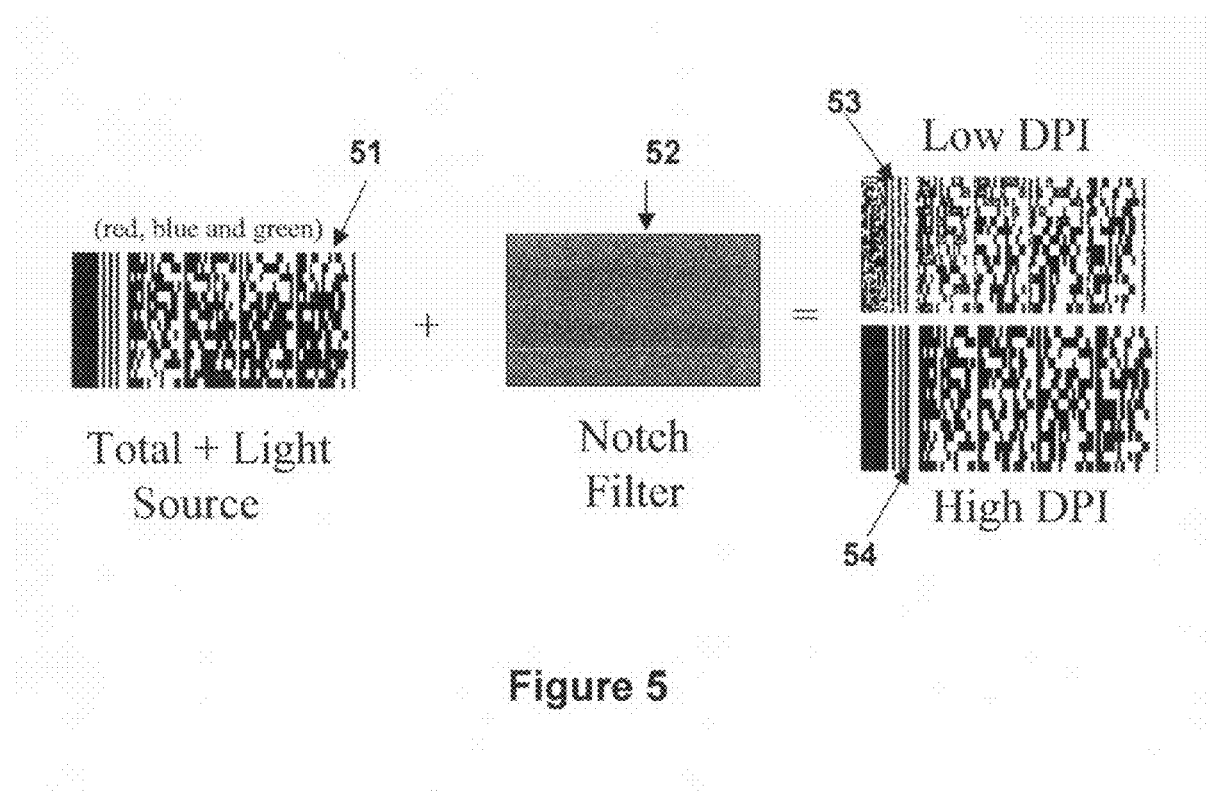
FIG. 5 is a diagram illustrating an embodiment of the method of FIG. 2, for recovery of a matrix code encoding information about an object, at either high or low resolution.

FIG. 5 depicts an embodiment of a method for recovering information from an indicium that has been energized with one or more predetermined wavelengths of light radiation. "Total+Light Source" 51 is Total Signal 44 (from FIG. 4) after irradiation by light energy. Notch Filter 52 passes blue and red light, and blocks green light. The resulting filtered signal is a detectable signal that can be read and decoded by an electronic image reader at low DPI (53) or at high DPI (54). The difference in the DPI level is relevant to what the Field of View in the camera system in the electronic image reader would "see" as the image. If the Field of View containing the image had very few pixels (less than about 4 per finest line), the resulting image will tend to be in poor focus. Conversely, if there are large numbers of pixels (greater than about 4 per finest line), then the resulting image tends to be well-resolved, and fine detail can be noted. This difference in resolution may affect how the software associated with the electronic image reader interprets this image and may also limit the number of masks that are used in the process.

Indicium

An indicium of the present disclosure is generally applied to a surface of an object or on to a package containing the object. Alternatively, the indicium may also be printed onto a substrate, such as an adhesive label, which can then be adhered to a surface of an object or packaging.

The indicium has a first printed pattern in a first predetermined color of ink; a second printed pattern in a second predetermined color of ink; and may have one or more additional printed patterns, where each of the additional patterns is also printed in a predetermined color of ink that is different than any previous color of ink. Each of the printed patterns encodes information in the form of a software-generated indicium, such as a 2-D barcode or matrix code, including but not limited to, examples such as DataMatrix, Aztec, PDF417, Ultracode, SuperCode, MiniCode, MaxiCode, and QR Code. The printed patterns are combined together to form an indicium that is undecipherable to the human eye or to an electronic image reader, but is decipherable to an authorized user when irradiating the indicium with light energy radiation, filtering the emitted signals from the indicium though one or more spectral filters, and detecting, reading, and decoding the filtered signals.

An indicium, as applied to the object or packaging, may be visible or covert under normal lighting conditions. The indicium is made of inks comprising a plurality of chemical pigments and/or dyes, wherein the chemical pigments and/or dyes are energized when irradiated by certain wavelengths of light in the UV, visible, or IR ranges, and emit light energy at different wavelengths than the absorbed light energy. At least one of the chemical pigments and/or dyes used in the indicium has an absorption to emission relationship that is UV to UV, UV to visible, UV to IR, visible to UV, visible to visible, visible to IR, IR to UV, IR to visible, and/or IR to IR. The emission and excitation spectra of the inkjettable chemical pigments may be selected to be narrow, in order to provide an authentication system with increased security.

In one embodiment, at least one of the printed patterns that form the indicium encodes unique, true information about an object. "True" information about an object, as used in this disclosure, means that the information can be used to identify, track and/or authenticate the object. This can be further enhanced by the use of incomplete codes, where part of the message can be printed in one color, and another part in another color. A filtering system may be required to attenuate one signal with respect to another in order to place the entire message within a valid amplitude range. Another alternative is to encode true information as complete codes with additional sections, where the entire message is printed with one image, and additional features are added that are close spectrally that render the image meaningless unless that wavelength is filtered out.

Another embodiment includes one or more printed patterns encoding "false" information, as illustrated in FIG. 1, that provides information that is nonsensical or intentionally incorrect, to serve as a deterrent to counterfeiting and to prevent identification, tracking, or authentication of the object by an unauthorized user. In other words, "false" information may be used to make the indicium too complicated to decipher, thereby discouraging, if not preventing, counterfeiting.

The indicium of the present disclosure is made of multiple colors of ink that are co-planar. Throughout this disclosure the term "co-planar" is intended to include also the term "co-conformal," defined as an arrangement of regions in an essentially non-overlapping fashion conforming to the surface, or the structure on which they are distributed, regardless of whether the surface or structure is truly planar, or contains irregularities or curvatures, providing the irregularities or curvatures remain susceptible of the printed image definition required for implementation of this disclosure. Each individual pixel in the indicium may have one color, or no color, printed at the address of that individual pixel, but cannot have two or more colors designated to be overprinted at the same address for that pixel. Thus the several colors that make up the indicium of the present disclosure are interlaced with each other, but have little or no overlapping. Although a co-planar indicium ideally has no overlap of colors between adjacent pixels, the present disclosure encompasses co-planar indicia where there is a small amount of overlapping ink colors along the edges of adjacent pixels. This small degree of overlapping colors may be due to bleeding of certain colors of inks, or to imprecise registration of the substrate on which the indicium is printed, particularly at the high line speeds possible for the indicia of this disclosure. For purposes of this disclosure, "co-planar indicia" encompass those indicia having less than about a 10% overlap of colors of inks along the edges of adjacent pixels within an indicium, and preferably encompasses those indicia having less than about a 5% overlap of colors of inks along the edges of adjacent pixels within an indicium. Less than about a 10% overlap, as used herein, means that the width of the overlapping inks extends less than about $1/10^{th}$ of the total length of the adjacent pixel. This result can be most readily accomplished using masks as described in the present disclosure.

An indicium is "covert" if not readily visible or electronically readable on the object under normal visible lighting conditions. A "covert indicium" is made of chemical pigments and/or dyes that absorb light energy in the UV, visible, or IR ranges, including those indicia made of chemical pigments and/or dyes that absorb light in the visible light range yet remain hidden or covert when printed on suitable (usually dark-colored) substrates. Other covert indicia are made of chemical pigments absorbing wavelengths of light at the edges of the visible light spectrum, such as 405 nanometers (nm) and 680 nm.

Masks

"Masks" (also referred to herein interchangeably as "bitmap masks") may be used in the present disclosure as an aid in printing an indicium accurately and precisely, and to assist in achieving co-planarity of the printed inks, even at the high printing speeds possible with inkjet printers. Masks are a software tool that operate on the indicia to be printed so that colors are interlaced, but do not overlap. Masks permit the printing of multiple inks from different print head sources in a way that minimizes ink-to-ink interaction, such as absorption. The resulting print exhibits a uniform intensity of the image where the ink is printed. Each pixel (or element) of the indicium to be printed will have a corresponding column and row address when represented as a 2-D barcode. Each bitmap mask is the same size as the indicium, and can also be represented in the same matrix form. As an example, if there are two printed patterns to be combined as an indicium, to be printed in two different colors, then two bitmap masks would be required. A first mask will operate with the first printed pattern, and the second mask will operate with the second pattern, and so on, for as many printed patterns as are combined to form the indicium. The masks are complementary in nature, so that for a given row and column address of the masks, there can only be one "1," and the corresponding values provided by all other masks for that same address must be "0." The first mask operates on the first indicium, address by address, with the result being a print file where the value of each element is the value of the indicium at that address (a "1" or a "0") multiplied by the value (a "1" or a "0") of the mask.

For example, if the value of the first 2-D barcode at the particular address of row 1, column 1 is a "," and the value of the mask at the same address is also a "1," then the print file will contain a "1" for that pixel, and will direct the printer to print that color of ink within that pixel. If, instead, the mask value at that address were "0," then the print file will contain a "0" and will direct a "no print" at that address. The use of complementary masks is one technique to ensure that the indicium will be printed without designating overlapping colors of ink to be printed in an individual pixel. The lack of overlapping colors creates a co-planar indicium, provided that mechanical alignments (or "registration") are correctly done and there is effectively no bleeding of colors of ink at the edges of adjacent pixels within an indicium. As noted above, co-planar indicia of the present disclosure can have less than 10% overlap of ink along the edges of adjacent pixels, and preferably have less than 5% overlap of ink at the edges of adjacent pixels within an indicium.

Alternatively, in situations where ink "bleeding" at the edges is unavoidable, one way to avoid mixing of the taggants at the pixel level is to select all masks having a "0" at a particular address, thereby creating a "no print" pixel between adjacent printed pixels.

Another alternative is to print multiple 2-D barcodes on top of one another where each barcode is printed in a separate fluorescing color. Filters can be used to remove all but the desired color, and the barcodes can be read. However, a difficulty with this technique is that the fluorescing inks can interact with one another, such that none of the indicia can be decoded even though each was properly printed. The difficulty can be overcome by creating two separate barcodes of the same pixel count and applying complementary masks to each barcode image prior to printing, dedicating every odd pixel to one image and every even pixel to the other image. It is also possible to change that ratio from 50/50 to other ratios by changing the masks and using repeating patterns based on 2×2 and 3×3 blocks, and so on. As an example, ¾ of one image can be printed and ¼ of another image can be printed. The advantage of this technique is apparent where one color of ink fluoresces significantly more than other colors, because weaker-fluorescing inks can be allocated a greater printing percentage.

Complementary masks work by creating identically-sized multiple (≥2) arrays, where one array has a value of one ("1") in the array address location and the others have a zero ("0") for that same address location. The type of system can be random order or a well-defined pattern. Mask operations combine the array mask 1 with the bitmap image of array 1, array mask 2 with the image array 2, and so on, by using the logical "and" operator. A composite image is the logical "or" of all of the previous mask/images sets where the color value of each array is maintained. A block system may be used to create a mask such as a 2×2 where the diagonal elements are black in one direction and white in the other. It is also possible to have the left side black, right side white, or the opposite. It is possible to have top side black, bottom side white, or the opposite. Thus, in a 2×2 mask, there are 6 possible mask permutations that result in the same 50% gray scale end product. It is also possible to have 2×2 masks having 3 black ("0") and 1 white ("1") element per group for a different gray scale. As an example, if the image were 150×150 pixels, and two complementary masks were created, each of the masks would have 50% "1"s and 50% "0"s. The logical "or" of the two masks would be a single 150×150 array with each value being a "1." The logical "and" of the same arrays would result in an array whose elements are all "0"s. It is possible to create arrays where 75% of the elements of one of the arrays are "1"s, and that 25% of the other arrays contains "1"s.

The complexity of the masks is increased for a 3×3 sub element array where the number of black ("0") elements can range from 1 to 8, and the patterns can be more complex. The reason behind the complexity is to find patterns that generate the desired gray scale, but also allow the camera system to recognize multitudes of submask sections as part of a "continuous" block that happens to "look" gray. Masks can be set up so that the electronic image reader can resolve the sub-arrays and attempt to decode the sub-arrays as a more complex barcode consisting of far more elements than intended. Typical print pixels for the Hewlett Packard TIJ 2.5 system, at a setting of 300 DPI, are only about 3 mils (0.0033 inches) in size, so if the camera system cannot resolve to that level, the system effectively sees a less intense image. The 2-D camera based barcode readers have internal AGC (automatic gain control), so the exposure time is modified to ensure that adequate intensity is collected for the system to read and image.

It has been found through experimentation with this method and system that the use of "non-random" bitmap masks in the printing process yields a better result than use of "random" bitmap masks. The use of random bitmap masks, besides requiring a significant amount of computation power, may lead to more instances where the electronic image reader is unable to recognize a 2-D barcode, and thereby unable to read and decode the indicium. This is because a 2-D barcode reader requires a column along the left side and across the bottom side of the barcode image (forming the shape of an "L") to be nearly solid black. If a random mask is used, the printer may generate a barcode having large breaks in the two sections forming the "L." If the breaks in the "L" are significant, the electronic image reader will be unable to recognize the indicium or barcode as readable, and thus will be unable to track or authenticate the object.

The present disclosure provides a set of masks for generating a co-planar indicium, comprising a first mask having a first software-generated array of addresses and a second mask having a second software-generated array of addresses, wherein the combination of the first addresses and the second addresses have no more than one logical one ("1") for an address, wherein the addresses identify the location of pixels within the co-planar indicium. The set of masks may further comprise a third mask having a third software-generated array of addresses, wherein the combination of the first addresses, the second addresses and the third addresses have no more than one logical one ("1") for an address. The set of masks may further comprise a fourth mask having a fourth software-generated array of addresses, wherein the combination of first addresses, second addresses, third addresses, and fourth addresses have no more than one logical one ("1") for an address. The set of masks may further comprise additional masks, wherein the combination of addresses has no more than one logical one ("1") for a particular address.

The bitmap masks, while typically comprising regular patterns (as demonstrated in FIG. 3), are not restricted to well-organized patterns. For example, in the case where one mask shows a shape of a polygon when viewed as a two-dimensional image, the other mask will be the outline of that polygon and all adjacent elements up to the effective edges of the mask, but not including any elements of the polygon.

"Color" is used in the present disclosure to mean an attribute resulting from the light energy emitted, transmitted, or reflected by an object. While color is typically an attribute of reflected light at wavelengths that are visible to the human eye, the term color also encompasses any wavelength of light energy that is emitted, transmitted or reflected, including those wavelengths in the UV, visible, and IR ranges. Thus, a first printed pattern in a "color" of ink made of pigments and/or dyes that emit light only in the IR spectrum are still considered to have a certain "color," even though the color is invisible to the human eye. In addition, a second printed pattern in a second "color" of ink that also emits only in the IR spectrum can be a "different" color than the first printed pattern described above, even though both patterns appear to be colorless (invisible) to the human eye.

As used in this application, "predetermined" and "preselected" are used interchangeably to mean something that has been selected before use and that has been provided, or is known, to an authorized or intended user of the system or method. For example, a method step requiring "one or more predetermined wavelengths of light radiation" means that the authorized user is provided with one or more light sources that will generate a particular wavelength or combination of wavelengths of light radiation when turned on, and/or knows which combination of light sources are to be turned on or remain off. Alternatively, the authorized user could be informed of the correct wavelengths of light necessary to properly activate the indicium by this method. Similarly, a "predetermined" color of ink would contain a particular pigment and/or dye, or combinations thereof, that are selected beforehand for a particular authorized user or customer.

"Plurality," as used in the present disclosure, means more than one. A plurality of a particular object therefore indicates two, three, four or more of that particular object.

Light Sources

The method and system of the present disclosure use multiple light sources to produce the one or more predetermined wavelengths of light radiation that irradiate an indicium. The light sources are capable of radiating specific wavelengths of light energy within the UV, visible, or IR ranges. As used in the present disclosure, an authorized user is provided with more than one light source, each producing different wavelengths of light energy. The authorized user is provided instructions about the specific combination of light sources to be used in the method, indicating which light sources are to be turned on and which other light sources are to remain turned off. For example, the authorized user may be instructed that, for a particular indicium, light sources 1, 3 and 4 are to be turned on, and light 2 is to remain turned off, thereby irradiating the indicium with certain predetermined wavelengths of light and causing the indicium to emit the proper signals that are then filtered through spectral filters, read, and decoded. However, in this example, if light 2 were also to be turned on with lights 1, 3 and 4 (for instance, by an unauthorized user who was not informed of the correct combination of light sources), then the portion of the indicium encoding false information could be activated, and prevent thereby an accurate decoding of the indicium. In another embodiment of the method, if the incorrect combinations of light sources were illuminated, only a portion of the proper signal required to track and/or authenticate the object would be emitted, preventing accurate decoding of the indicium.

Spectral Filters

Spectral filters (also called optical filters) that are used with the disclosed system and method include, but are not limited to, long pass filters, short pass filters, tunable filters color-specific filters, and notch filters. "Long pass filters" pass signals of a longer wavelength. An example of a long pass filter would be a color glass filter such as Schott Glass OG530, which exhibits a 50% transmission of optical signal at 530 mm. The optical transmission below 530 nm is less, but transmission of light energy beyond 530 nm is greater. The Schott Glass filter would block blue emission, but pass red emission. "Short pass filters" are generally opposite in their filtering properties as compared to long pass filters, and pass signals that are less than a specified wavelength, and block signals that are greater than the specified wavelength. There are relatively few examples of short pass filters in the visible spectrum using colored glass. Most short pass filters are interference filters and are made with combinations of glass, air gap spacings, and thin film coatings. "Notch filters," which are created using thin film coating technology, can be used with transparent substrates, or combined with long pass filters or short pass filters to create specific spectral transmission bands in spectral location and spectral width. For example, a typical CCD camera pixel element has a spectral sensitivity that ranges from 0.4 to 1.1 microns. The filter can be supplied as a screw-on filter that is similar to the familiar filters used on cameras. The filter is likely to consist of several glass sections with multiple thin film layers, and is less subject to spectral variation due to aging, temperature or input angular variation. The one or more spectral filters used in the present disclosure are selected from the group consisting of notch filters, color-specific filters, long pass filters, short pass filters, and tunable filters, or combinations thereof.

Multiple levels of notch filters can be used to create very transparent and blocked sections of the spectrum of visible light through infrared light. Notch filters are typically commercially created on 8-inch×8-inch glass sections and then cut to size for cost reasons. A typical ½-inch×±½-inch notch filter would be relatively inexpensive. There can be a large tradeoff space between desired optical density, transmission percentage in the unblocked area, notch width and wavelength location. Notch filters are created with the desired chemical pigments already defined.

The spectral filter set will only pass the section with transmission windows (that will appear white), while rejecting the blocked area (that will appear black). The contrast level may be chosen with the spectral filter design depending on design and anticipated error rates.

All camera pixel elements for barcode readers are very small photodetectors. The pixel responds to the light intensity that impinges on it, exposure time and the pixel spectral sensitivity. The detector is read out via an electronic system that outputs a signal proportional to the amount of integrated light on the detector. The result is a gray scale that ranges from total black to total white (saturation). Color is only created through the use of spectral filtering and a priori knowledge of the filtering. This method of authentication would, in effect, be part of the security design. It is preferable to use combinations of color glass filters with notch filters because the notch filters are thin films that can be directly applied to the color glass filters to achieve very clean spectral features that can be imaged with low loss and distortion.

An alternative approach to the 2-D electronic image reader is to use a digital camera. Digital cameras do not have the correct internal signal processing, but contain some filtering. Typical camera filtering is by the Bayer mosaic method, whereas color filters cover individual pixels in a pattern. Typically, this pattern consists of two green, one blue, and one red filter arranged in a super pixel. The camera reconstructs this color based input from adjacent pixels and mathematical algorithms. An advantage of this approach is that absorptive filters are already included in the camera and the notch filters will sharpen the edges. A disadvantage is that the algorithms already are resident in the device and are not easily changed.

A further alternative is use of a "tunable" color filter. Such technology is commercially available from suppliers such as CRI, Inc. (Woburn, Mass., U.S.A.). This device is based on polarization using Lyot filters. Tuning is accomplished with liquid crystals whose retardation is voltage controlled. The optical quality through these filters is excellent, as demonstrated by their use in contrast enhancers for microscopes as well as multi-spectral imaging. Typical filters have very narrow passbands of 20 nm. This can be modified by changing the number of Lyot filter stages and good design practice. Typical construction consists of crystal quartz plates, liquid crystals and sheet polarizers. The polarizers tend to dominate in this field as they span the visible light spectrum, but not the IR (or can achieve the near IR at the expense of the visible). Tunable color filters tend to be expensive but offer user-selectable windowing. The device is really a wavelength-variable bandpass filter. The spectral width would not be variable. The units are also temperature dependent, so some form of thermal compensation is required.

Electronic Image Readers

An electronic image reader is used in the method and system of the present disclosure to detect and "read" images that have passed through the spectral filters. As used in this disclosure, an "electronic image reader" encompasses any type of electronic "vision" system that is combined with processing electronics and decoding software and/or firmware. The electronic image readers are usually associated with decoding software to interpret the detected information. The types of images that can be detected and read include one-dimensional (1-D) and two-dimensional (2-D) barcodes or data matrix codes. Well-known examples of electronic image readers are 2-D barcode readers, commercially available as Symbol Technology's DS6607 handheld scanner (Symbol Technologies, Inc., Holtsville, N.Y., U.S.A.). Other examples include high speed line readers/verifiers produced by companies such as Cognex and Videk. Electronic image readers also encompass the cameras found in digital cameras and in cellular telephones The 2-D barcode readers generally incorporate black and white charge-coupled device (CCD) arrays, typically sub-megapixel. To facilitate use, the devices are configured to have a wide Field of View, a long and short focal distance, and can read and decode barcodes with low contrast ratios at angles far from normal incidence without regard to the image orientation. These units can decode images that are black-on-white or white-on-black without preference.

The method of the present disclosure overcomes the lack of a sufficient contrast ratio that can ordinarily be a problem when using an electronic image reader to read an indicium. Irradiating the indicium with multiple light sources of one or more predetermined wavelengths of light energy, followed by spectral filtering of the emitted signal, improves the contrast ratio, thereby improving detection, reading and decoding of the indicium by the electronic image reader.

Printers

Inkjet technology for multi-color printing can be used in the methods described above. The desired indicium mark is small, typically less than 0.25 inches square. A DataMatrix mark of EC200 in a 12×12 or a 14×14 element will provide a reasonable number of alphanumeric characters. Typical industrial grade print heads function well at 300 DPI, but may jet out too much ink at 600 DPI. The ink can bleed into adjacent areas, effectively lowering the printed resolvable DPI count. At ¼-inch DataMatrix size and 300 DPI, the barcode will consist of just 75×75 pixels. The "L"-shaped section of the DataMatrix code (the solid bars along the left side and bottom side of the barcode) is required for orientation purposes, and has to be recognized by the electronic image reader. In order to maintain a greater degree of covertness, it is desirable to have the same proportion of each color in the "L" section as in the barcode elements. This would only leave a few pixels to create that section. The electronic image reader would have to interpret the individual pixels as a full line. Masks can ensure that the image intensity remains uniform throughout the barcode, which aids in the decoding process. The smaller the barcode image, the greater the need for better positional registration between colors.

The problem of accurate registration is addressed in the disclosure by the method of incorporating multiple print heads each having its own supply inks, although some inks may contain multiple emitters. These print heads are mechanically registered and referenced. The conveyor system also has additional requirements to minimize belt shimmy and belt movement versus encoder errors. This results in reasonable quality prints without major registration errors or optical absorption issues with the ink.

Inkjet technology is primarily used for creating the indicium of the present disclosure, because inkjet technology allows on-demand printing of unique serialization of products at the unit box level at packaging line conveyor speeds.

"Ink," or "inks," as used herein, means a liquid ink or a dry powder containing pigments and/or dyes that are used to render an image to a surface or substrate. The image can be visible or covert to the human eye. As used in the present disclosure, inks include, but are not limited to, the liquid inks used by inkjet printers as well as the toners used by laser printers. Inkjet-compatible inks include, but are not limited to, water-based and solvent-based formulations.

Laser printers may also be used to print the co-planar indicia used in the methods of the present disclosure. Laser jet printers generally use toner, rather than inks, but such toners can contain pigments and/or dyes in the same fashion as inks for purposes of this disclosure. Toners contain other materials that allow the toner to bind to a surface when heated. Toners may use resins, wax or similar materials as binders, and the formulation may also include release agents, charge control agents, and other additives. Toners of the kind used in the present disclosure are generally made by the conventional toner method or the chemically processed toner (CPT) method. Toner particles can be very small (one micron or smaller) so that the actual volume of a toner particle can be much smaller than the volume of inkjet ink released during the process of printing a single dot. The smallest discernable dot size with a laser type of printer can be adjusted to be smaller or larger, depending on the type of print system used.

Adhesion of the print to the substrate requires consideration of the porosity and surface energy of the substrate to be printed as well as the surface energy, surface type, viscosity, and chemical composition of the ink. Chemical or corona pre-treatment may be used, although these are expensive treatments that are not typically used for paper, but can be used where the ink will not adhere to the surfaces.

The following list describes the surface energies of various substrate materials for purposes of printing:

| Substrate Material | surface energy (dynes/cm) |
| --- | --- |
| Polytetrafluoroethylene | 18 |
| Polypropylene | 31 |
| Polyvinyl chloride | 39 |
| Nylon 6 | 42 |
| Polyethylene terephthalate | 44 |
| Cellulose | 44 |
| Polycarbonate | 46 |
| Glass | 47 |
| Polyether sulfone | 50 |

The actual surface energy of a substrate material may vary based on production methods and the use of various coatings or surface treatments. Ink formulation may be optimized based on knowledge of the surface energy of the specific substrate material.

Adhesion of the print to the substrate may be measured by several protocols. One such protocol is a rub test. A standard protocol is the Sutherland rub test for printed materials ASTM D5264-98 (2004).

Desk jet inkjet printers, which may be thermal inkjet or piezo type printers, can be used to print a co-planar indicium of the present disclosure, and used in the methods and systems disclosed herein. Desk jet inkjet printers offer the benefit of very high quality printing, and are useful where few indicia are needed, or where printing at high speeds is not critical. Desk jet printers are particularly useful for printing indicia for high-value goods.

The printers used for these applications are generally non-contact type, where the object or packaging to be marked with an indicium moves under (or adjacent to) the printer head. This is different than the operation of a typical consumer's desktop inkjet printer, where the printer head moves very accurately over the surface over the item to be printed, rather than the other way around. Typical ink jet printers use either thermal or piezo methods of ejecting the ink from the printer head. Each type of device has different ink requirements that must also be met.

A typical example of a printing system used for this disclosure is the Hewlett Packard TIJ 2.5 system (Hewlett Packard Specialty Printing Systems, San Diego, Calif., U.S.A.), which is a thermal ink jet printing system. This type of print head can print at up to 600 DPI depending on line speed conditions.

Some form of conveyor system is used to move the article or package into position, and some form of alignment device is used to ensure that the correct side of the object or package is facing the printer head. Line speed is measured by an encoder wheel and is directly related to distance traveled. A master trigger is generated by such items as a photo-detector cell so that the position of the object or package is known. Delays are calculated based on position and rate of speed, so that an indicium or mark is printed at the desired location.

Errors in this type of system can involve the lateral movement of the conveyor belt, thickness variation of the belt, and/or variability in the encoder wheel and belt driver rollers. Any alignment devices to orient the article or package can produce friction that can change the relative position of the indicium to be printed as compared to where the indicium was supposed to be located. This can result in small but significant registration errors. "Registration," in this context, is used to mean the mechanical alignment and/or orientation of the object or packaging so that the indicium can be applied at the intended location, and with minimal overprinting.

An advantage of the present disclosure is that it provides a practical method for an indicium to be applied to an object or packaging at the high processing speeds possible with inkjet printing. Such processing speeds or line speeds by this method range from about 1 foot per minute to about 240 feet per minute, with typical processing speeds or line speeds of about 20 feet per minute or faster. The processing speeds or line speeds are accomplished by placing one or more inkjet print heads in series and/or in staggered formation, wherein each print head is printing in a different color of ink. The inkjet print heads are scheduled to apply ink onto the surface of the object by timing the speed of the objects on the belt. The indicium can be accurately applied by this method at these processing speeds, even where the indicium encodes individualized, non-sequentially serialized data about the object.

The one or more inkjet print heads are preferably placed in series so that the multiple colors can be printed accurately and at higher speeds. The indicia used in this method can be printed at about 300 DPI or greater. The use of one inkjet delivery head greatly simplifies the task because print head-to-print head registration is not required. For multiple color ink printing, an indicium is created on a pixel-by-pixel basis.

Multi-color printing of the indicium provides many more chemical and coding permutations and so creates a sophisticated system for tracking and/or authenticating objects that is easy to use by an authorized user, but extremely difficult to copy or counterfeit by unauthorized users. Many of the commercially-available inks that are used to create indicia interact with each other, and so it is not always possible to combine various chemical pigments and/or dyes together and print with a single combined ink. In some instances, the ink vehicles are not compatible. Minimizing interaction requires that the inks be accurately placed at the pixel level, so that an individual printed pixel is largely separate from its adjacent pixels. This implies that registration accuracy must be held to the sub-pixel level, or a buffer zone used that allows an unprinted pixel between adjacent printed pixels.

The method of the present disclosure uses an indicium to track, and/or authenticate an object by applying the indicium to the object or to its packaging, irradiating the indicium with light radiation, passing the emitted signals from the indicium through one or more spectral filters, and detecting, reading, and decoding the filtered signals with an electronic image reader. The object may be tracked or authenticated by comparing the decoded signals with a "signature" for that object that was created and logged in for that object when the indicium was applied. The indicium used in this method has a first printed pattern in a first predetermined color of ink; a second printed pattern in a second predetermined color of ink; and may have one or more additional printed patterns in a predetermined color of ink, where each of the printed patterns encodes information, and where each predetermined color of ink is a different color than any other predetermined color of ink previously applied.

Another embodiment of the present disclosure provides a method for authenticating objects comprising the steps of: applying a covert indicium to an object to be authenticated; irradiating the covert indicium with one or more predetermined wavelengths of light radiation such that the covert indicium emits one or more wavelengths of light energy at a different wavelength than the absorbed wavelength; filtering the emitted signal through one or more spectral filters; and reading the filtered signals with an electronic image reader, which is decoded by software. Where an extra layer of encryption has been used, the decoding step may incorporate extra software decryption. The resulting decoded information is then compared with separate information that is unique to the object for tracking or inventory purposes, and/or known to correlate with an authentic object. The covert indicium in the embodiment has a first printed pattern in a first predetermined color of ink, a second printed pattern in a second predetermined color of ink, and may have one or more additional printed patterns in a predetermined color of ink; where each of the printed patterns encodes information in the form of a software-generated indicium; and where each predetermined color of ink is a different color than any other predetermined color of ink previously applied within the covert indicium. The covert indicium is made of multiple colors of ink that are co-planar, and was printed after logically "anding" a bitmap mask with each indicium encoding information about the object.

Another embodiment of the present disclosure is a process for applying an indicium to the surface of an object or packaging for tracking and/or authenticating the object, including: selecting a location on the surface to apply the indicium; registration of the article to align the article to accurately print the indicia; and using an inkjet printer to apply a plurality of chemical pigments and/or dyes to the surface of the object or packaging as a first indicium and a second indicium that are combined to form an indicium.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances that fall within the scope of the appended claims.

The invention claimed is:

1. An indicium that is applied to a surface of an object, comprising:
a first printed pattern in a first ink having a first color, wherein the first printed pattern is a 2-D barcode comprising unit cells; and
a second printed pattern in a second ink having a second color, wherein the second printed pattern is another 2-D barcode comprising unit cells;
wherein the unit cells in the first and second printed patterns are pixelated in arrays of pixels in rows and columns with each pixel having a corresponding row and column address in the respective unit cells, and the second pattern is complimentary to the first pattern in that the first and second printed patterns are printed within the same area of the object, corresponding pixel addresses of the first and second printed patterns are not designated to be printed with both the first ink and the second ink, and the first printed pattern and the second printed pattern are aligned to form a co-planar indicium; and
wherein the indicium further comprises at least a third printed pattern in an at least third ink having a third color, wherein the third printed pattern is complimentary to the first printed pattern and the second printed pattern, and the first printed pattern, the second printed pattern, and the at least third printed pattern are aligned to form the co-planar indicium, wherein the first printed pattern and the second printed pattern encode true information and at least one of the at least third printed pattern encodes false information.

2. The indicium according to claim 1, wherein at least one of the first printed pattern and the second printed pattern encodes true information.

3. The indicium according to claim 1, wherein at least one of the first printed pattern and the second printed pattern encodes false information.

4. The indicium according to claim 1, wherein complementary masks are used to form the co-planar indicium.

5. The indicium according to claim 4, wherein the number of complementary masks equals the total number of inks comprising the indicium.

6. The indicium according to claim 1, wherein the co-planar indicium is covert.

7. The indicium according to claim 1, wherein the co-planar indicium is decipherable by one or more light sources, one or more spectral filters, and/or a combination thereof.

8. The indicium according to claim 7, wherein the co-planar indicium is undecipherable until the indicium is irradiated with light radiation causing the indicium to emit an emitted signal, wherein the emitted signal is subsequently filtered through one or more spectral filters to produce a filtered signal, and wherein the filtered signal is read and decoded by an electronic image reader.

9. The indicium according to claim 8, wherein the light radiation comprises one or more predetermined wavelengths of light in the ultraviolet, visible, and/or infrared ranges, and combinations thereof.

10. The indicium according to claim 8, wherein the one or more spectral filters are selected from notch filters, color-specific filters, long pass filters, short pass filters, tunable filters, and/or combinations thereof.

11. The indicium according to claim 1, wherein the co-planar indicium has no more than 10% overlap of the first ink and second ink in adjacent pixels.

12. The indicium according to claim 1, wherein complementary masks are used to form the co-planar indicium.

13. The indicium according to claim 12, wherein the number of complementary masks equals the total number of inks comprising the indicium.

14. The indicium according to claim 1, wherein the co-planar indicium is applied to a surface of an object by printing directly on the surface of the object.

15. The indicium according to claim 1, wherein the co-planar indicium is printed onto a substrate that can be adhered to the surface of the object.

16. The indicium of claim 1, wherein for a pixel having a given row and column address there is only one type of ink printed corresponding to one of the printed patterns and the pixel at the corresponding row and column address is unprinted for all other printed patterns.

17. The indicium of claim 1, wherein the arrays of pixels for the first printed pattern and the second printed pattern comprise identically-sized rows and columns of pixel addresses.

18. A method of applying an indicium to an object, the method comprising the steps of:
printing a first printed pattern in a first ink having a first color, wherein the first printed pattern is a 2-D barcode comprising unit cells and wherein the unit cells are pixelated in arrays of pixels in rows and columns with each pixel having a corresponding row and column address in the unit cells of the first pattern; and
printing a second printed pattern in a second ink having a second color, wherein the second printed pattern is another 2-D barcode comprising unit cells and wherein the unit cells are pixilated in arrays of pixels in rows and columns with each pixel having a corresponding row and column address in the unit cells of the second printed pattern, and wherein the second printed pattern is complimentary to the first pattern in that the first and second printed patterns are printed within the same area of the object, corresponding pixel addresses of the first and second printed patterns are not designated to be printed with both the first ink and the second ink, and the first printed pattern and the second printed pattern are aligned to form a co-planar indicium; and
printing at least a third printed pattern in an at least third ink having a third color, wherein the third printed pattern is complimentary to the first printed pattern and the second printed pattern, and the first printed pattern, the second printed pattern, and the at least third printed pattern are aligned to form the co-planar indicium, wherein the first printed pattern and the second printed pattern encode true information and at least one of the at least third printed pattern encodes false information.

19. The method of claim 18, wherein bitmap images for the first pattern and the second pattern are logically anded to generate the indicium.

* * * * *